United States Patent
Natanzon et al.

(10) Patent No.: US 9,575,894 B1
(45) Date of Patent: Feb. 21, 2017

(54) APPLICATION AWARE CACHE COHERENCY

(71) Applicant: EMC IP Holding Company LLC, Hopkinton, MA (US)

(72) Inventors: Assaf Natanzon, Tel-Aviv (IL); Brian Lake, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/670,544

(22) Filed: Mar. 27, 2015

(51) Int. Cl.
*G06F 12/00* (2006.01)
*G06F 12/08* (2016.01)
*G06F 12/12* (2016.01)
*G06F 3/06* (2006.01)

(52) U.S. Cl.
CPC ........ *G06F 12/0833* (2013.01); *G06F 3/0619* (2013.01); *G06F 3/0665* (2013.01); *G06F 3/0688* (2013.01); *G06F 3/0689* (2013.01); *G06F 12/128* (2013.01); *G06F 2212/62* (2013.01); *G06F 2212/69* (2013.01)

(58) Field of Classification Search
CPC .. G06F 12/00; G06F 12/0238; G06F 12/0246; G06F 12/0811; G06F 12/0815; G06F 12/0897; G06F 3/0679
USPC .................. 711/100, 103, 117, 118, 141, 154
See application file for complete search history.

(56) References Cited

U.S. PATENT DOCUMENTS

| | | | | | |
|---|---|---|---|---|---|
| 6,006,342 | A | * | 12/1999 | Beardsley | G06F 11/2097 714/5.11 |
| 6,513,097 | B1 | * | 1/2003 | Beardsley | G06F 11/0724 711/113 |
| 8,762,643 | B2 | * | 6/2014 | Ishii | G06F 12/0866 711/118 |
| 2009/0240869 | A1 | * | 9/2009 | O'Krafka | G06F 12/0284 711/103 |
| 2012/0173922 | A1 | * | 7/2012 | Cheng | G06F 11/1417 714/13 |
| 2015/0095576 | A1 | * | 4/2015 | Subrahmanyam | G06F 12/0891 711/119 |

* cited by examiner

*Primary Examiner* — Tuan Thai
(74) *Attorney, Agent, or Firm* — Muirhead and Saturnelli, LLC (57) ABSTRACT

A distributed processing system includes a first site and a second site, each containing at least one device having cache storage, nonvolatile storage, where, in response to moving a process running on the processor of the first site to the processor running on the second site, data in the cache storage of the first site is no longer accessed by the process, the data being read into the cache of the storage of the first site in response to the process accessing data in the nonvolatile memory of the first site prior to being moved to the second site. A process running on the processor of the first site moving to the processor running on the second site and corresponding cache slots may be detected by parsing the VMFS containing virtual machine disks used by the process.

15 Claims, 8 Drawing Sheets

APPLICATION AWARE CACHE COHERENCY

TECHNICAL FIELD

This application is related to the field of data storage and, particularly, to systems for managing data and resources in a virtualized environment.

BACKGROUND OF THE INVENTION

A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. A virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM that may be moved between different locations and processing thereafter continued without interruption. Reference is made to U.S. Pat. No. 8,667,490 B1 to van der Goot, entitled "Active/Active Storage and Virtual Machine Mobility Over Asynchronous Distances," which is incorporated herein by reference.

While data and processes are moved between different sites, it is desirable that the cached data be kept coherent with respect to modifications that may be made to the data at the different sites. An example of a system for providing distributed cache coherence is described in U.S. Pat. No. 7,975,018 to Unrau et al., entitled "Systems and Methods for Providing Distributed Cache Coherency," which is incorporated herein by reference. Other systems and techniques for managing and sharing storage array functions among multiple storage groups in a storage network are described, for example, in U.S. Pat. No. 7,266,706 to Brown et al. entitled "Methods and Systems for Implementing Shared Disk Array Management Functions," which is incorporated herein by reference.

One drawback to maintain cache coherency is that, after a VM, application and/or process (hereinafter, collectively, "process") is moved from an originating location to a destination location, the cached data for the process may be maintained on the originating location. Although cache coherency may provide cached data consistency, data access efficiency may suffer if a process on a first site needs to access cached data on a second site. Accordingly, it would be desirable to provide a system that addresses the above-noted problems and efficiently and effectively provides for handling cached data for a process that is moved from one site to another.

SUMMARY OF THE INVENTION

According to the system described herein, a distributed processing system includes a first site containing at least one device having cache storage, nonvolatile storage, and at least one processor that accesses the storage of the first site and a second site, coupled to the first site, containing at least one device having cache storage, nonvolatile storage, and at least one processor that accesses the storage of the second site, where, in response to moving a process running on the processor of the first site to the processor running on the second site, data in the cache storage of the first site is no longer accessed by the process, the data being read into the cache of the storage of the first site in response to the process accessing data in the non-volatile memory of the first site prior to being moved to the second site. Data in the cache storage of the first site no longer being accessed may include destaging data that had been modified by the process after being read into the cache of the first site and may include removing any remaining data from the cache of the first site. Data in the cache storage of the first site no longer being accessed may include transferring data from the cache of the first site to the cache of the second site. Data that is transferred from the cache of the first site to the cache of the second site may be deleted from the cache of the first site after the transfer. In response to the process accessing a portion of the data that has not yet been transferred from the cache of the first site to the cache of the second site, the portion of the data may be transferred to the cache in the second site prior to being accessed by the process. In response to the portion of the data having been modified by the process after being read into the cache of the first site, the portion of the data may be destaged to non-volatile storage in connection with transferring the portion of the data. Each of the sites may include at least one host processing device and at least one disk array storage device and the process may run on at least one of the hosts. A process running on the processor of the first site moving to the processor running on the second site and corresponding cache slots may be detected by parsing the VMFS containing virtual machine disks used by the process.

According further to the system described herein, managing a distributed processing system includes providing a first site containing at least one device having cache storage, nonvolatile storage, and at least one processor that accesses the storage of the first site, providing a second site, coupled to the first site, containing at least one device having cache storage, nonvolatile storage, and at least one processor that accesses the storage of the second site, moving a process running on the processor of the first site to the processor running on the second site, and causing data in the cache storage of the first site to no longer be accessed by the process, the data being read into the cache of the storage of the first site in response to the process accessing data in the non-volatile memory of the first site prior to being moved to the second site. Causing data in the cache storage of the first site to no longer be accessed may include destaging data that had been modified by the process after being read into the cache of the first site and may include removing any remaining data from the cache of the first site. Causing data in the cache storage of the first site to no longer be accessed may include transferring data from the cache of the first site to the cache of the second site. Data that is transferred from the cache of the first site to the cache of the second site may be deleted from the cache of the first site after the transfer. In response to the process accessing a portion of the data that has not yet been transferred from the cache of the first site to the cache of the second site, the portion of the data may be transferred to the cache in the second site prior to being accessed by the process. In response to the portion of the data having been modified by the process after being read into the cache of the first site, the portion of the data may be destaged to non-volatile storage in connection with transferring the portion of the data. A process running on the processor of the first site moving to the processor running on the second site and corresponding cache slots may be detected by parsing the VMFS containing virtual machine disks used by the process.

According further to the system described herein, a non-transitory computer-readable medium containing software that manages a distributed processing system has a first site containing at least one device having cache storage, non-volatile storage, and at least one processor that accesses the storage of the first site and a second site, coupled to the first site, containing at least one device having cache storage, nonvolatile storage, and at least one processor that accesses the storage of the second site. The software includes executable code that moves a process running on the processor of the first site to the processor running on the second site and executable code that causes data in the cache storage of the first site to no longer be accessed by the process, the data being read into the cache of the storage of the first site in response to the process accessing data in the non-volatile memory of the first site prior to being moved to the second site. Causing data in the cache storage of the first site to no longer be accessed may include destaging data that had been modified by the process after being read into the cache of the first site and may include removing any remaining data from the cache of the first site. Causing data in the cache storage of the first site to no longer be accessed may include transferring data from the cache of the first site to the cache of the second site. Data that is transferred from the cache of the first site to the cache of the second site may be deleted from the cache of the first site after the transfer. A process running on the processor of the first site moving to the processor running on the second site and corresponding cache slots may be detected by parsing the VMFS containing virtual machine disks used by the process.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
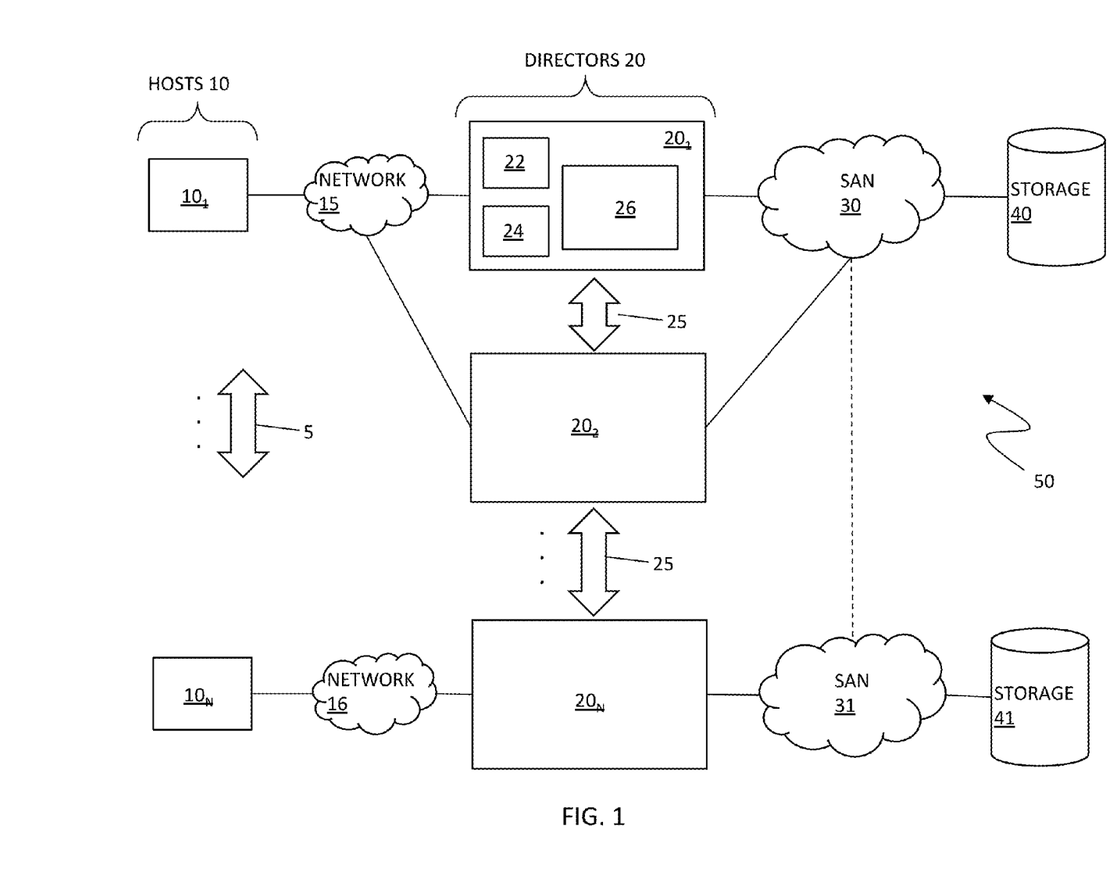
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. In general, "N" is used herein to indicate an indefinite plurality, so that the number "N" when referred to one component does not necessarily equal the number "N" of a different component. For example, the number of hosts 10 may or may not equal the number of directors 20 in FIG. 1. Cache memory may generally be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another.

Each of the directors 20 may also expose (make available) one or more logical units (volumes) and have one or more file systems deployed on the logical units, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. In some embodiments, the networks 15, 16 may be combined, at least in part, with the SAN networks 30, 31 while in other embodiments, the networks 15, 16 may be completely separate from the SAN networks 30, 31. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a VPLEX product produced by EMC Corporation of Hopkinton, Mass. and/or a vSphere product produced by VMware Inc. of Palo Alto, Calif. The system described herein may also be used in connection with any storage device, including a storage product produced by EMC Corporation, such as a Symmetrix product. Although principally discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31, that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
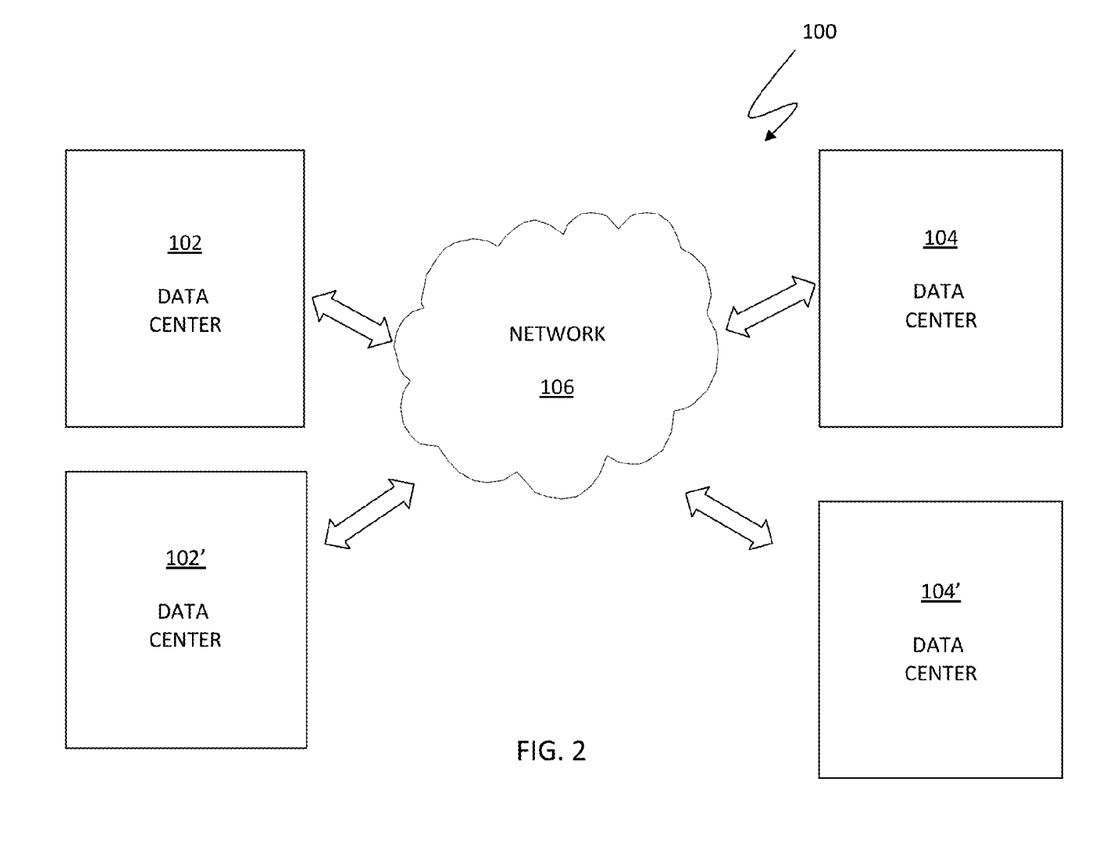
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with the data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/ applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
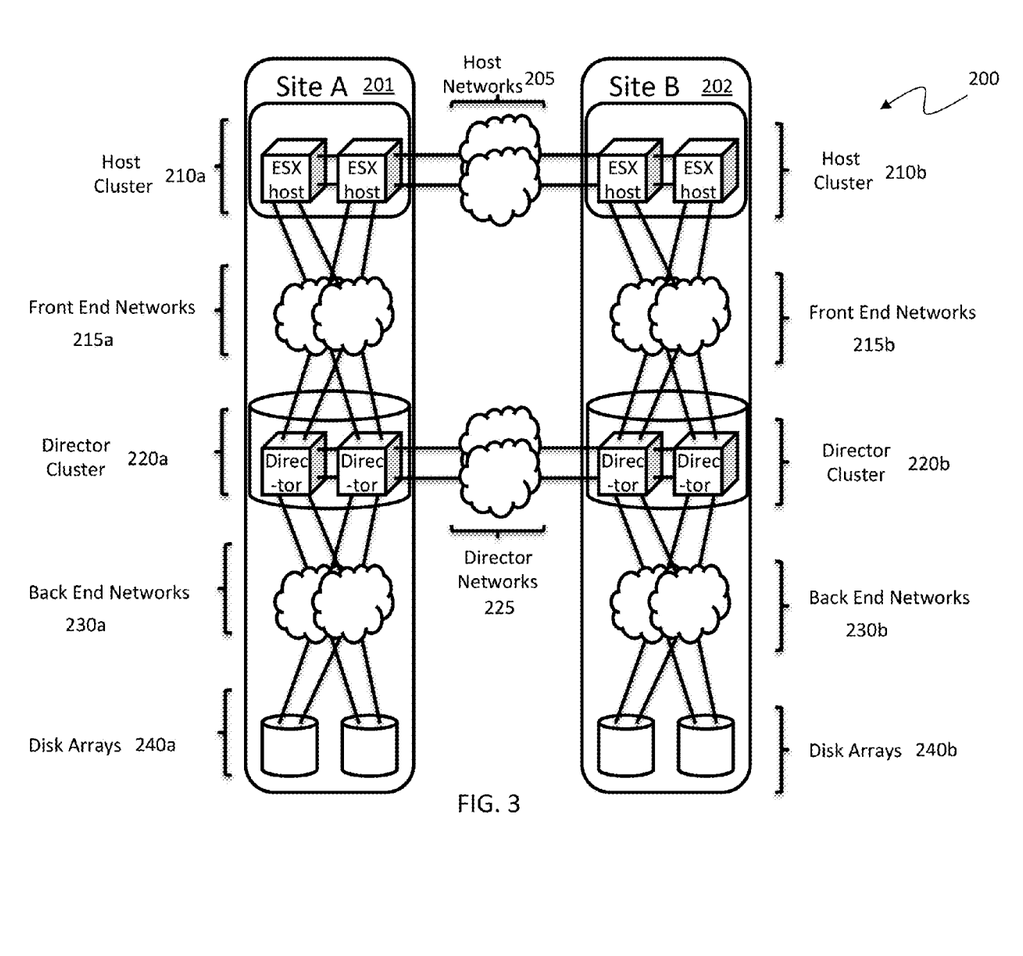
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts possibly grouped in host clusters 210a, 210b, one or more directors possibly grouped in director clusters 220a, 220b, and disk array storage device 240a, 240b. Each host cluster 210a, 210b and director cluster 220a, 220b may each include software and/or other controllers or interfaces to control or administer operations in connection with described functions of the hosts and directors. In an embodiment, each host cluster 210a, 210b may include hosts, such as ESX hosts, in a vSphere cluster and each director cluster 220a, 220b may include directors in a VPLEX cluster. It is noted that although ESX hosts and illustrated and discussed herein as examples, any appropriate host may be used in connection with the system described herein. Front end networks 215a, 215b may connect through host links to the host clusters 210a, 210b and through front end links to the director clusters 220a, 220b. One or more back end networks 230a, 230b may connect through back end links to the director clusters 220a, 220b and through array links to the disk array storage devices 240a, 240b. In an embodiment, the front and back end networks may be Fibre Channel networks. The front end networks 215a, 215b allow the hosts (or VMs running therein) to perform input/output (I/O) operations with the host clusters 210a, 210b, while the back end networks 230a, 230b allow the directors of the director clusters 220a, 220b to perform I/O on the disk array storage devices 240a, 240b. One or more host networks 205, such as vSphere Ethernet networks, may connect the ESX hosts in host clusters 210a, 210b. One or more director networks 225 may connect the directors of the director clusters 220a, 220b. In some embodiments, the host networks 205 and the director networks 225 may overlap or possibly even be the same network.

Various types of failures, including network failures within a cluster, may result in behaviors that are further discussed elsewhere herein. It should be noted that the host cluster 210a, 210b (e.g., vSphere cluster) may be connected in such a way that VMs can maintain their network addresses (e.g., IP, FC, IB, etc. addresses) when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may roll-back the image of the data to a write order consistent point. In other words, the director cluster may roll-back the image of the data to a point where it knows the data that is available on both clusters, or to a time where the write data was exchanged between both sites. The director cluster may also guarantee roll-back to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. Known techniques may provide write order consistency by grouping writes in what are called deltas and providing the consistency on a delta boundary basis. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. Pat. No. 8,667, 490 B1 to van der Goot, entitled "Active/Active Storage and Virtual Machine Mobility Over Asynchronous Distances," which is incorporated herein by reference.

Figure 4:
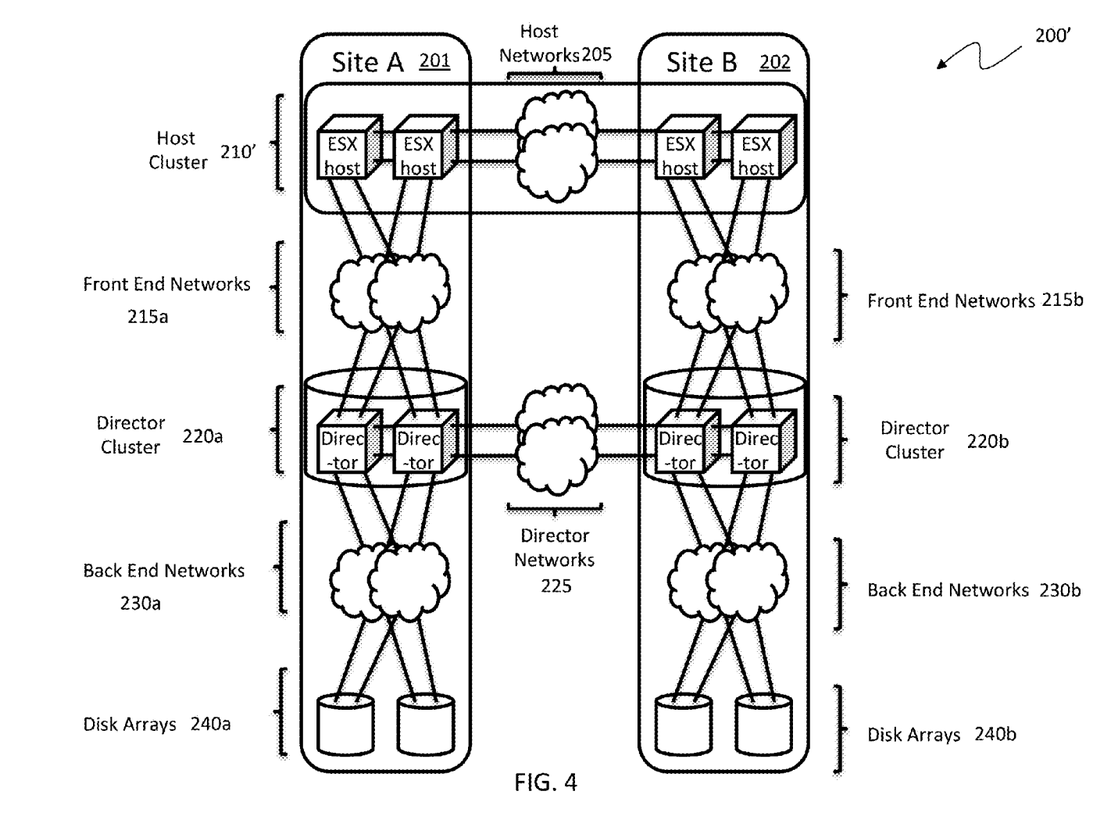
FIGS. 4 and 5 show alternative configurations of distributed storage systems that may be used in accordance with embodiments of the system described herein.
Figure 5:
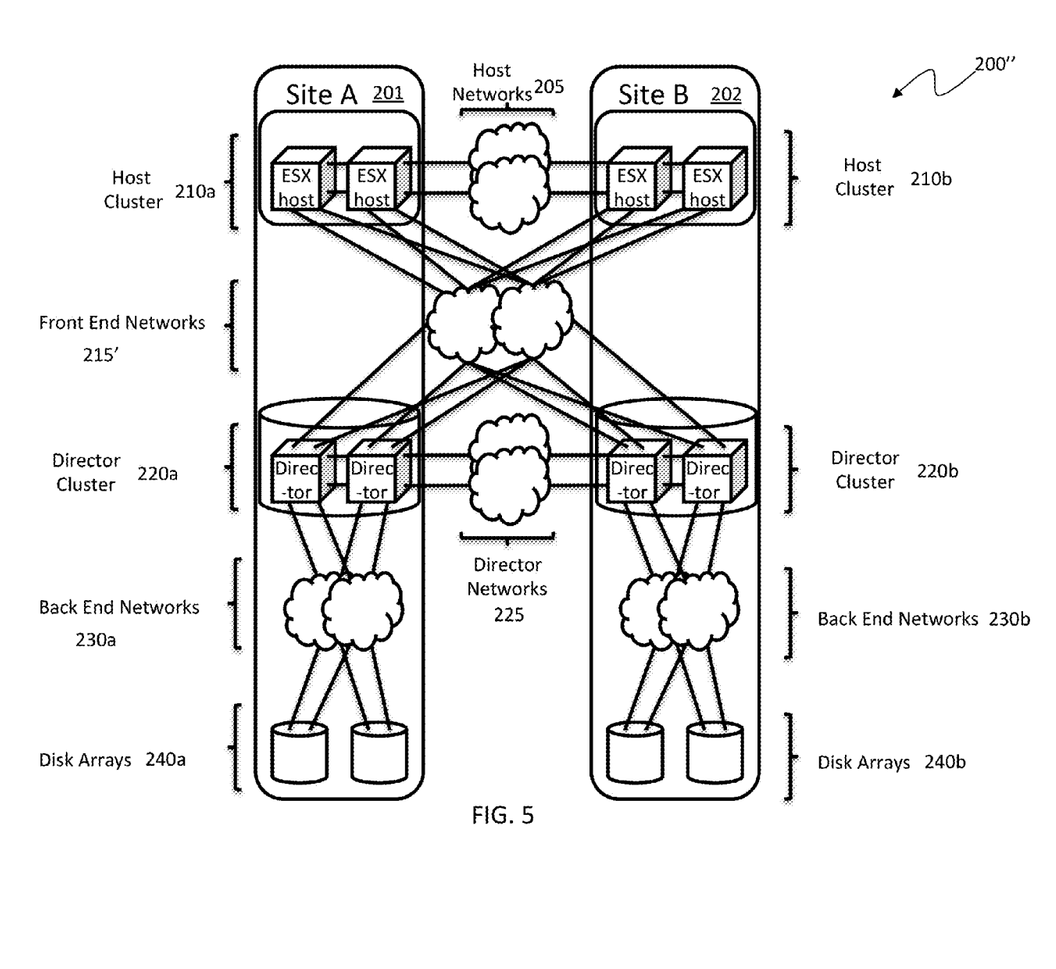

FIGS. 4 and 5 show alternative configurations for distributed storage systems that may be used in accordance with embodiments of the system described herein. In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

Figure 6:
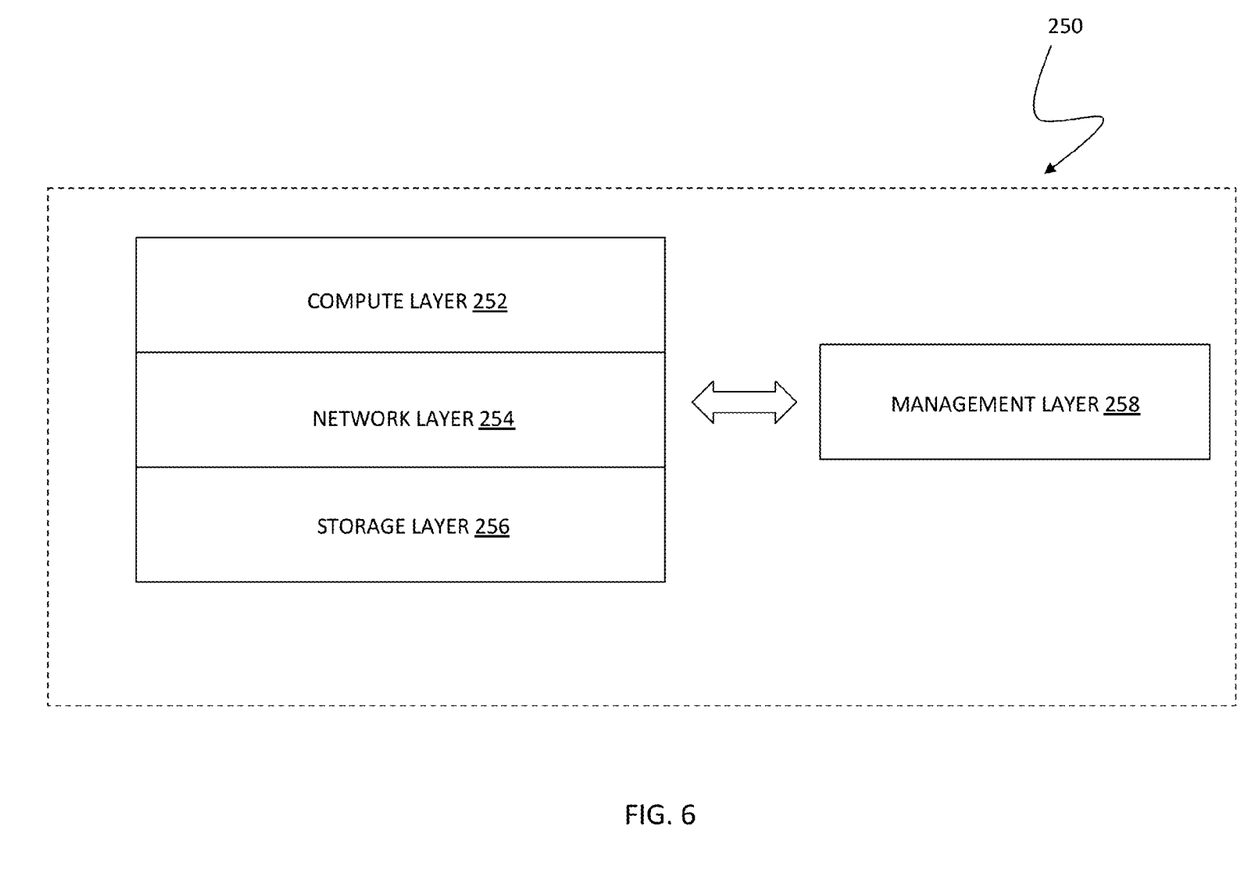
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute 252 and storage 256 layers within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM).

As discussed elsewhere herein, it is possible to move a VM from one site to another. It is also possible to have distributed applications that move from one site to another or possibly to have portions of applications move from one site to another. In such cases, the distributed cache manager 26, which is discussed elsewhere herein, provides coherence for shared data across a distributed set of directors. However, although the cache manager 26 allows for an application at one site to access cache at a different site, doing so may be inefficient. For example, an application at site A accessing cache data at site B would require that the data be transferred from site A to site B, which may add a significant amount of overhead in addition to the latency associated with transferring the data and sending and receiving any signals (e.g., handshaking signals) used in connection with the transfer.

Figure 7:
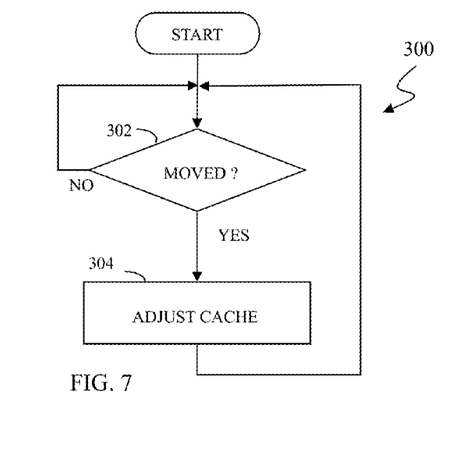
FIG. 7 is a flow diagram illustrating processing performed in connection with handling cached data for processes that have been moved, according to an embodiment of the system described herein.

Referring to FIG. 7, a flow diagram 300 illustrates processing performed in connection with the distributed cache manager 26 (and/or another appropriate component of the system) handling movement of VMs and/or specific application(s) and/or portions thereof (hereinafter collectively referred to as "processes") from an originating location to a destination location. Processing begins at a first step 302 where it is determined if a process and corresponding virtual machine disks have moved from one site to another. The determination at the test step 302 may be performed using any appropriate mechanism. For example, in an embodiment, the system automatically detects when a process on a first site accesses cache at a second site (i.e., a process on the destination location accesses data in cache of the originating location). In another embodiment, a signal may be specifically provided as part of moving a process from one site to another. For example, the VPLEX system may send a signal to the cache manager 26 in connection with moving a VM from the originating location to the destination location. In another embodiment, When a VM is moved, it is possible to parse the VMFS containing the disks the VM uses, and determine which block belongs to the virtual machine disk of the moved VM and thus which process(es) have moved and which cache block(s) may need to be moved between the sites. Of course, other appropriate mechanisms for detecting process and virtual machine disk storage movement are also possible.

If it is determined at the test step 302 that a process has moved, then control transfers from the test step 302 to a step 304, where cache handling for the process is adjusted. The particular adjustment performed at the step 304 can be one or more of a number of possibilities. For example, in one embodiment, the adjustment at the step 304 includes simply removing cache entries that are still present in the originating location and thus allowing local cache entries at the destination location to be created in the usual fashion. In another embodiment, slots in the cache are transferred from the originating location to the cache of the destination location. The different embodiments are discussed in more detail elsewhere herein. Following the step 304, control transfers back to the step 302 for another iteration.

Figure 8:
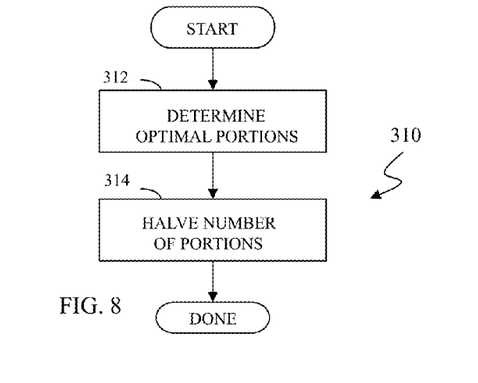
FIG. 8 is a flow diagram illustrating processing performed in connection with removing cached data from an originating location according to an embodiment of the system described herein.

Referring to FIG. 8, a flow diagram 310 illustrates processing performed in connection with an embodiment where cache slots for a process that has been moved are removed from cache at the originating location. Processing begins at a first step 312 where dirty cache slots at the originating location are destaged. Following the step 312 is a step 314 where the remaining cache slots (that were not dirty) are removed from the cache. Following the step 314, processing is complete.

Figure 9:
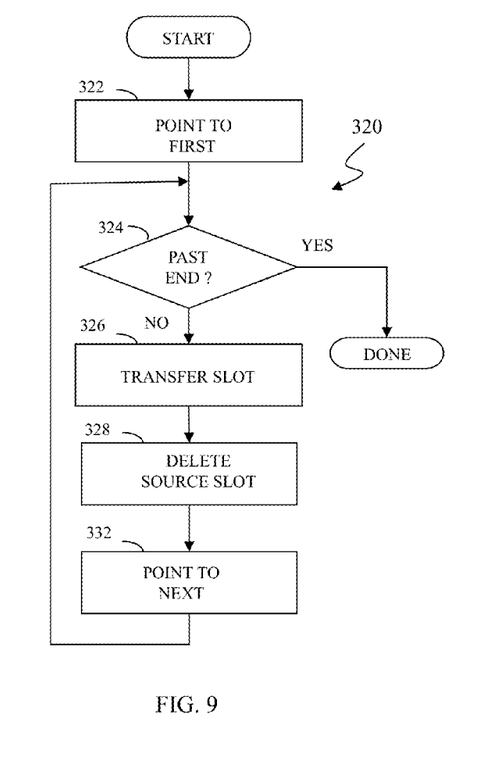
FIG. 9 is a flow diagram illustrating processing performed in connection with transferring cache slots from an originating location to a destination location according to an embodiment of the system described herein.

Referring to FIG. 9, a flow diagram 320 illustrates steps performed in connection with transferring cache slots from the originating location to the destination location following moving a process from the originating location to the destination location. Processing begins at a first step 322 where an iteration pointer, that iterates through all of the cache slots, is set to point to the first slot. Following the first step 322 is a test step 324 where it is determined if the iteration pointer points past the end of the list of cache slots (i.e., all relevant cache slots have been transferred). If so, then processing is complete. Otherwise, control transfers from the test step 324 to a step 326 where the slot indicated by the iteration pointer is transferred from the originating location to the destination location. Following the step 326 is a step 328 where the slot that was transferred is deleted from the originating location. Following the step 328 is a step 332 where the iteration pointer is incremented. Following the step 332, control transfers back to the step 324 for another iteration.

Note that, in connection with the embodiment illustrated in the flow diagram 320 of FIG. 9, it is possible for a cache slot to be accessed prior to being transferred from the originating location to the destination location. One possibility is to simply access cache slots in transition at either the originating location or the destination location, whichever is appropriate. Alternatively, it is possible to accelerate transition of a slot from the originating location to the destination location in response to an access request for the specific slot.

Figure 10:
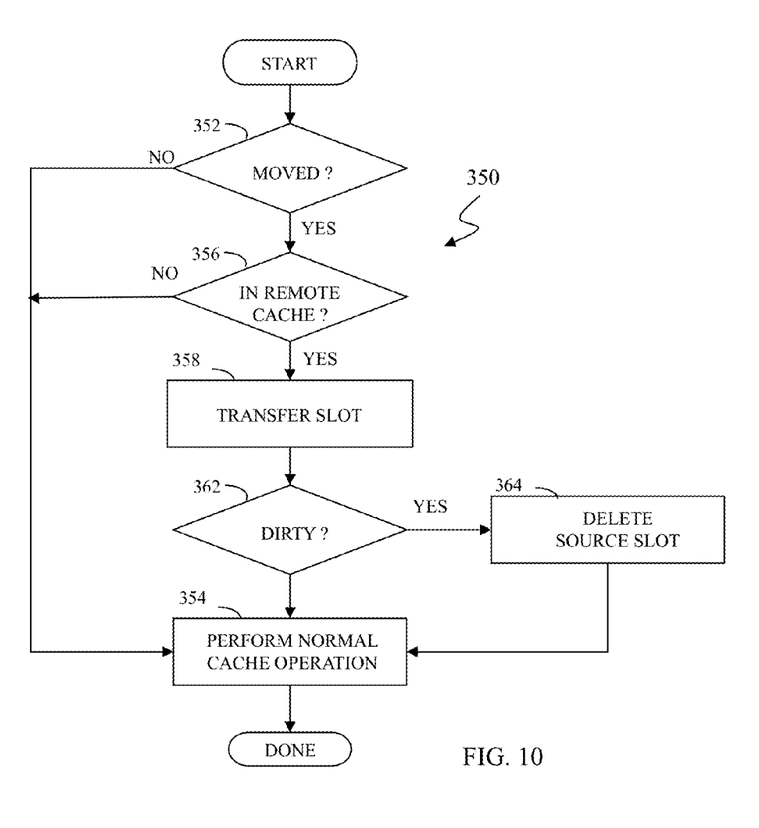
FIG. 10 is a flow diagram illustrating processing performed in connection with accessing a cache slot in a process according to an embodiment of the system described herein.

Referring to FIG. 10, a flow diagram 350 illustrates processing performed in connection with accessing data in cache for a process, where the cache slot may be at a different site. Processing begins at a first test step 352 where it is determined if the corresponding process has been moved (or has been moved recently). Note that, if a process has never been moved (or at least not recently), then all of the cache slots corresponding to the process would be local to the process (i.e., the process and the corresponding cache slot would be on the same site). If it is determined at the test step 352 that the process has not been moved (and so the corresponding cache slot is local), then control transfers from the test step 352 to a step 354 where normal (local) cache access operations are performed. Following the step 354, processing is complete.

If it is determined at the test step 352 that the process has been moved, then control transfers from the test step 352 to a test step 356 where it is determined if the corresponding cache slot is still in the cache of the originating location. If not (i.e., the slot has already been moved to the destination location), then control transfers from the test step 356 to the step 354, discussed above, where normal (local) cache access operations are performed. Following the step 354, processing is complete. If it is determined at the test step 356 that the corresponding cache slot is still in the cache of the originating location, then control transfers from the test step 356 to a step 358 where the cache slot is transferred from the originating location to the destination location.

Following the step 358 is a test step 362 where it is determined if the slot being transferred is dirty (i.e., has been written to while in cache but has not been destaged to non-volatile memory). In an embodiment herein, dirty slots may be transferred from the originating location to the destination location and, subsequently, is destaged at the destination location. In other embodiments, it is possible to simply destage the dirty slot at the originating location and then transfer the slot to the destination location with an indication that the slot is no longer dirty.

If it is determined at the test step 362 that the slot is not dirty, then control transfers from the test step 362 to the step 354, discussed above, where normal (local) cache access operations are performed. Following the step 354, processing is complete. Otherwise, if it is determined at the test step 362 that the slot being transferred is dirty, then control transfers from the test step 362 to a step 364 where the slot at the originating location is deleted from the cache. Following the step 364 is the step 354, discussed above, where normal (local) cache access operations are performed. Following the step 354, processing is complete. Note that it is acceptable to maintain the non-dirty cache slot in the originating location while, alternatively, a dirty cache slot is deleted from the originating location. This is because having two versions of a dirty cache slot in the system may result in data inconsistencies.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and/or with any other appropriate point-in-time copy mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A distributed processing system, comprising:
a first site containing at least one device having cache storage, nonvolatile storage, and at least one processor that accesses the cache storage of the first site and the non-volatile storage of the first site, wherein particular data is read into the cache storage of the first site in response to the at least one processor of the first site accessing the particular data in the non-volatile memory of the first site; and
a second site, coupled to the first site, containing at least one device having cache storage, nonvolatile storage, and at least one processor that accesses the cache storage of the second site and the non-volatile storage of the second site, wherein, in response to moving a process running on the at least one processor of the first site to the at least one processor running on the second site, a cache slot at the first site for the particular data is destaged from the cache storage of the first site.

2. The distributed processing system of claim 1, wherein the particular data in the cache storage of the first site is transferred to the cache storage of the second site.

3. The distributed processing system of claim 2, wherein the particular data is deleted from the cache storage of the first site after the transfer.

4. The distributed processing system of claim 2, wherein in response to the process accessing a portion of the particular data that has not yet been transferred from the cache storage of the first site to the cache storage of the second site, the portion of the particular data is transferred to the cache storage of the second site prior to being accessed by the process.

5. The distributed processing system of claim 1, wherein each of the sites includes at least one host processing device and at least one disk array storage device and wherein the process runs on at least one of the hosts.

6. The distributed processing system of claim 1, wherein a process running on the processor of the first site moving to the processor running on the second site and corresponding cache slots are detected by parsing the virtual machine file system containing virtual machine disks used by the process.

7. A method of managing a distributed processing system, comprising:
providing a first site containing at least one device having cache storage, nonvolatile storage, and at least one processor that accesses the cache storage of the first site and the non-volatile storage of the first site, wherein particular data is read into the cache storage of the first site in response to the at least one processor of the first site accessing the particular data in the non-volatile memory of the first site;
providing a second site, coupled to the first site, containing at least one device having cache storage, nonvolatile storage, and at least one processor that accesses the cache storage of the second site and the non-volatile storage of the second site;
moving a process running on the at least one processor of the first site to the at least one processor running on the second site; and
causing a cache slot at the first site for the particular data to be destaged from the cache storage of the first site in response to moving the process from the first site to the second site.

8. The method of claim 7, wherein the particular data in the cache storage of the first site is transferred from the cache storage of the first site to the cache storage of the second site.

9. The method of claim 7, wherein the particular is deleted from the cache storage of the first site after the transfer.

10. The method of claim 9, wherein in response to the process accessing a portion of the particular data that has not yet been transferred from the cache storage of the first site to the cache storage of the second site, the portion of the particular data is transferred to the cache storage of the second site prior to being accessed by the process.

11. The distributed processing system of claim 7, wherein a process running on the processor of the first site moving to the processor running on the second site and corresponding cache slots are detected by parsing the virtual machine file system containing virtual machine disks used by the process.

12. A non-transitory computer-readable medium containing software that manages a distributed processing system having a first site containing at least one device having cache storage, nonvolatile storage, and at least one processor that accesses the cache storage of the first site and the non-volatile storage of the first site and a second site, coupled to the first site, containing at least one device having cache storage, nonvolatile storage, and at least one processor that accesses the cache storage of the second site and the non-volatile storage of the second site, the software comprising:
executable code that reads particular data into the cache storage of the first site in response to the at least one processor of the first site accessing the particular data in the non-volatile memory of the first site;
executable code that moves a process running on the at least one processor of the first site to the at least one processor running on the second site; and executable code that causes a cache slot at the first site for the particular data to be destaged from in response to moving the process from the first site to the second site.

13. The non-transitory computer-readable medium of claim 12, wherein the particular data in the cache storage of the first site is transferred from the cache storage of the first site to the cache storage of the second site.

14. The non-transitory computer-readable medium of claim 12, wherein the particular data is deleted from the cache storage of the first site after the transfer.

15. The non-transitory computer-readable medium of claim 12, wherein a process running on the processor of the first site moving to the processor running on the second site and corresponding cache slots are detected by parsing the virtual machine file system containing virtual machine disks used by the process.

* * * * *